United States Patent
Bailey et al.

(10) Patent No.: US 6,803,346 B1
(45) Date of Patent: Oct. 12, 2004

(54) ANTI-ACCRETION ADDITIVES FOR DRILLING FLUIDS

(75) Inventors: Louise Bailey, St. Neots (GB); Boyd Grover, Bromsgrove (GB)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 09/622,454

(22) PCT Filed: Jan. 28, 1999

(86) PCT No.: PCT/GB99/00298
§ 371 (c)(1),
(2), (4) Date: Nov. 15, 2000

(87) PCT Pub. No.: WO99/42539
PCT Pub. Date: Aug. 26, 1999

(30) Foreign Application Priority Data

Feb. 17, 1998 (GB) .............................................. 9803249

(51) Int. Cl.⁷ ................................................ C09K 7/02
(52) U.S. Cl. ....................... 507/128; 507/140; 507/145; 507/237; 507/235; 507/274
(58) Field of Search ................................ 507/128, 140, 507/145, 237, 235, 274

(56) References Cited

U.S. PATENT DOCUMENTS

| 4,481,120 A | | 11/1984 | Heilweil | |
|---|---|---|---|---|
| 5,250,512 A | | 10/1993 | Ohmoto et al. | |
| 5,473,093 A | | 12/1995 | Jaffe | |
| 5,496,476 A | | 3/1996 | Tang et al. | |
| 5,529,125 A | * | 6/1996 | Di Lullo Arias | ............ 507/237 |
| 5,639,715 A | | 6/1997 | Patel | |
| 5,807,811 A | * | 9/1998 | Malchow | ............ 507/128 |

FOREIGN PATENT DOCUMENTS

| DE | 17 19 428 A | 2/1973 |
|---|---|---|
| DE | 44 04 219 A | 8/1995 |
| GB | 1 146 245 | 3/1969 |
| GB | 2 111 560 A | 7/1983 |
| GB | 2 177 711 A | 1/1987 |
| GB | 2 293 373 A | 3/1996 |

* cited by examiner

*Primary Examiner*—Philip C. Tucker
(74) *Attorney, Agent, or Firm*—Thomas O. Mitchell; Stephen Schlather; Robin Nava

(57) ABSTRACT

Additives for drilling fluids, in particular for water-based drilling fluids are described which when added to the fluid at levels of up to 10% weight by volume reduces the accretion and bit-balling tendencies of shale cuttings exposed to said fluids. The additives are based on phosphonate chemistry, and are of the general class (I), wherein R, R' and R" are radicals exclusively containing H atoms or combinations of H, C, O or P atoms up to a maximum of 100 atoms.

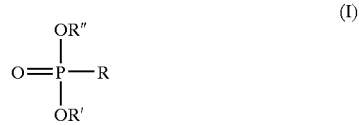

(I)

11 Claims, No Drawings

ANTI-ACCRETION ADDITIVES FOR DRILLING FLUIDS

This application is a 371 of PCT/GB99/00298 filed Jan. 28, 1999, which claims priority from GB 9803249.3 filed Feb. 17, 1998.

This invention relates to anti-accretion additives for drilling muds.

BACKGROUND OF THE INVENTION

Bit-balling and cuttings accretion are problems encountered when drilling shales, particularly with water-based muds. Shale cuttings can adhere to each other and to the bottom hole assembly and cutting surfaces of the bit. Gradually a large plastic mass builds up which can block mud circulation and reduce rates of penetration. There is a "danger zone" of clay plasticity for balling and accretion, related to the water content of the clay or shale, which can be defined in terms of the Atterberg limits of soil mechanics. In the dry zone the clay has too little water to stick together and it is a friable and brittle solid. In the wet zone the material is essentially liquid like with very little inherent strength and can be washed away.—Intermediate to these zones, i.e., in the danger zone, the shale is a sticky plastic solid with greatly increased agglomeration properties and inherent strength.

When cuttings are exposed to conventional water-based muds they usually imbibe water and pass rapidly through these different zones, eventually dispersing. However recent advances in drilling fluid technology have developed highly inhibitive muds which appear to reduce the hydration of shale and in doing so maintain the cuttings in the danger or plastic zone contributing to increased accretion and bit-balling. Field experiences with glycol, phosphate and silicate muds in particular have shown accretion problems.

U.S. Pat. No. 5,639,715 describes additives for bit-balling prevention based on sulphonosuccinate chemistry.

Phosphorus based additives and compound have been used in the oilfield industry mainly for the purpose of enhancing oil recovery from production wells.

It is the object of the present invention to find alternatives to the known methods of preventing accretion.

SUMMARY OF THE INVENTION

The invention is an additive for drilling mud. The additive reduces the accretion and bit-balling tendencies of cuttings exposed to said muds. The additives are based on phosphonate chemistry, and are preferably of the general class:

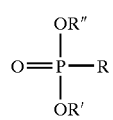

(I)

wherein R, R' and R" are radicals exclusively containing H atoms or combinations of H, C, O or P atoms up to a maximum of 100 atoms.

In a more preferred embodiment, the additives are based on the formula

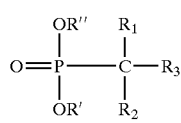

(II)

wherein $R_1$, $R_2$ and $R_3$ are radicals exclusively containing H atoms or combinations of H, C, O or P atoms up to a maximum of 100 atoms.

In a preferred embodiment of the invention, the additives are containing not more than one phosphor atom.

In another preferred embodiment of the invention, the additive is a phosphor derivative of the succinic acid or short chain phosphorylated hydrocarbons.

Additives according to the invention are added to the drilling fluid at levels 0.1–10%, preferably 1–5%, weight by volume (% kg/liter). The drilling fluid itself may be oil based, though it is recognized that accretion tends to be less pronounced in drilling muds of this kind. Therefore, the preferred drilling fluid in accordance with the present invention is water based, even more preferably a reactive anionic based drilling fluid, such as silicate or phosphate based muds. Further additives as known in the art may be added to impart other desired properties to the mud system. Such known additives include viscosifying agents, filtrate reducing agenst, and weight adjusting agents. Other preferred additives are shale-swelling inhibitors, such as salts glycol-, silicate- or phosphate-based agents, or any combination thereof.

These and other features of the invention, preferred embodiments and variants thereof, and further advantages of the invention will become appreciated and understood by those skilled in the art from the detailed description below.

MODE(S) FOR CARRYING OUT THE INVENTION

A test used to determine the anti-accretion properties of additives involves squeezing shale or clay cuttings between two steel plates with a given force causing them to stick to each other and the plates. The force required to slide the plates apart is then determined using a force gauge or spring balance.

Oxford clay cuttings of size 2–4 mm were soaked in the test fluid for 15 minutes. The excess mud was drained from the cuttings using a sieve (500 micron mesh). A small pile of cuttings (5–10 g) was put onto the base plate of the tester. The pile was roughly levelled and the top plate replaced over the cuttings. A PTFE spacer was placed on top of the top plate. A screw-mounted plunger in the tester housing was wound down until it made contact with the spacer. A torque wrench was used to tighten the plunger onto the top plate. The standard torque was 75 inch-pounds (~9N.m). Immediately on reaching this value, the plunger was wound back sufficiently to remove the spacer. A force gauge or spring balance was then connected to the top plate. The tension on the top plate was then increased by pulling on the force gauge until the plate breaks free from the cuttings bed. The maximum force recorded was the freeing force for the plate or accretion value. Values can range from 1.0 to above 20.0 kg force.

The phosphonate based additives tested in accordance with the above procedure are added to a water-based mud containing tetrapotassium pyrophosphate (TKPP) and consisting of

- 1000 ml fresh water (base)
- 85.5 g tetrapotassium pyrophosphate (shale inhibitor)
- 2.85 g xanthan gum (viscosifier)
- 11.4 g carboxy methyl cellulose of low viscosity grade (filtrate reducer)
- 42.75 g simulated drill solids
- barite (weighting agent) to density 1.08 sg.
- NaOH to pH 9.2
- biocide Baseline accretion values were established as:

| | |
|---|---|
| Simple polymer mud | 5 kg |
| TKPP mud | 21.7 kg |

The anti-accretion additives were then added to the TKPP mud at levels of 1–5%.

Additives which reduced the accretion value from >10 kg to 9 kg or below were:

Hydrolysed polymaleic acid
3-phosphonopropionic acid
succinic acid
propyl phosphonic acid
dibutyl-butyl phosphonate
hydroxyphosphonoacetic acid
dimethylpropyl phosphonate
phosphorous acid
diethyl-ethylphosphonate
ethylmethacylate phosphate
tri-ethyl phosphonoacetate
tetramethyl phosphonosuccinate
phosphonosuccinic acid
2-hydroxyethyl phosphonic acid.

The last five additives (Additives 9–14) were the found most effective. For those the following values were recorded:

| TKPP mud + (%) additive: | Accretion value |
|---|---|
| 1% diethyl-ethylphosphonate | 8 kg |
| 5% diethyl-ethylphosphonate | 7 kg |
| 5% ethylmethacrylate phosphate | 6 kg |
| 1% tri-ethyl phosphonoacetate | 8 kg |
| 5% tri-ethyl phosphonoacetate | 5 kg |
| 5% tetramethyl phosphonosuccinate | 7 kg |
| 5% phosphonosuccinic acid | 7 kg |
| 5% 2-hydroxyethyl phosphonic acid. | 7 kg |

In a second series of tests with the additives, silicate mud of the following composition was used:

1000 ml sea water (base)

131 g Na silicate, a solution of 14% NaOH and 27% $SiO_2$ (shale inhibitor)

117.5 g KCl (shale inhibitor, weighting agent)

20 g Polyanionic cellulose (filtrate reducer)

5 g Xanthan gum (viscosifier)

NaOH to adjust pH to 12.

Baseline accretion values were established as:

| | |
|---|---|
| simple polymer mud | 9.5 kg |
| silicate mud | 17.7 kg |

The anti-accretion additives were tested in the silicate mud at 1% (w/v):

| Silicate mud + (1%) additive: | Accretion value |
|---|---|
| diethyl-ethylphosphonate | 11.1 kg |
| tri-ethyl phosphonoacetate | 11.35 kg |
| tetramethyl phosphonosuccinate | 9.96 kg |
| phosphonosuccinic acid | 10.8 kg |
| 2-hydroxyethyl phosphonic acid | 11.4 kg |

In most cases the accretion value has been reduced significantly, down to the levels of a simple polymer mud.

What is claimed is:

1. A drilling fluid comprising
   water as base component;
   a viscosifying agent to increase the viscosity of the fluid;
   a filtrate reducing agent;
   a weighting agent to adjust the density of the fluid;
   a shale swelling inhibition agent comprising phosphate or silicate based compounds; and
   an additive for a drilling fluid, consisting of a compound in accordance with the formula

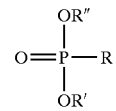

wherein R, R' and R" are radicals exclusively containing H atoms or combinations of H, C, O or P atoms up to a maximum of 100 atoms.

2. The drilling fluid of claim 1, wherein R, R' and R" are radicals exclusively containing H atoms or combinations of H, C or O.

3. The drilling fluid of claim 1, wherein the additive consists of a compound in accordance with the formula

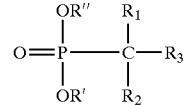

wherein $R_1$, $R_2$ and $R_3$ are radicals exclusively containing H atoms or combinations of H, C, O or P atoms up to a maximum of 100 atoms.

4. The drilling fluid of claim 3, wherein $R_1$, $R_2$ and $R_3$ are radicals exclusively containing H atoms or combinations of H, C or O.

5. A method of preventing accretion of cuttings in a borehole, said method comprising the step of preparing a drilling fluid comprising a viscosifying agent to increase the viscosity of the fluid, a filtrate reducing agent, a weighting agent to adjust the density of the fluid, a shale swelling inhibition agent comprising phosphate or silicate based compounds and an additive for a drilling fluid, consisting of a compound in accordance with the formula

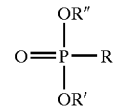

wherein R, R' and R" are radicals exclusively containing H atoms or combinations of H, C, O or P atoms up to a maximum of 100 atoms.

6. The method of claim 5, wherein the additive is added in a concentration of up to about 10% weight by volume of the drilling fluid.

7. The drilling fluid of claim 1, wherein the additive is based on a phosphor derivative of the succinic acid.

8. The drilling fluid of claim 1, wherein the additive is based on a short phosphorylated hydrocarbon.

9. The drilling fluid of claim 1, comprising the additive in a concentration of up to about 10% weight by volume.

10. The drilling fluid of claim 1, wherein the shale swelling inhibition agent comprises phosphate based compounds.

11. The drilling fluid of claim 1, wherein the shale swelling inhibition agent comprises silicate based compounds.

* * * * *